United States Patent [19]

Donovan et al.

[11] Patent Number: 5,638,500

[45] Date of Patent: Jun. 10, 1997

[54] APPARATUS AND METHOD FOR DIRECT CALCULATION OF CLIP REGION

[75] Inventors: Walter E. Donovan, Milpitas; Timothy J. Van Hook, Menlo Park, both of Calif.

[73] Assignee: Sun Microsystems, Inc., Mountainview, Calif.

[21] Appl. No.: 636,713

[22] Filed: Apr. 23, 1996

Related U.S. Application Data

[63] Continuation of Ser. No. 236,510, Apr. 28, 1994, abandoned.

[51] Int. Cl.$^6$ ................................................. G06T 15/30
[52] U.S. Cl. ........................ 395/134; 395/133; 395/119
[58] Field of Search ............................ 395/133, 134, 395/135, 119; 345/118; 382/293

[56] References Cited

U.S. PATENT DOCUMENTS

| | | | |
|---|---|---|---|
| 5,040,130 | 8/1991 | Chang et al. | 395/134 |
| 5,079,719 | 1/1992 | Maillo | 395/134 |
| 5,295,240 | 3/1994 | Priem et al | 395/134 |
| 5,357,600 | 10/1994 | Shirman et al. | 395/133 |
| 5,369,741 | 11/1994 | Hartog et al. | 395/143 |

OTHER PUBLICATIONS

Foley et al., *Computer Graphics Principles and Practice*, 1992, pp. 279–280.

Foley, van Dam, Feiner, Hughes *Computer Graphics Principles and Practice* Nov. 1992, pp. 111–124 and pp. 271–278.

Primary Examiner—Heather R. Herndon
Assistant Examiner—Stephen Hong
Attorney, Agent, or Firm—Blakely Sokoloff Taylor & Zafman

[57] ABSTRACT

An apparatus and method calculate outcodes directly from an integral representation of a floating point number defining a certain coordinate of a point of an object to be displayed. Such calculations under software control are absent any Boolean conventional branch instructions which impede system performance and utilize an integer unit rather than a floating point unit so as to enable transformations of viewing parameters and calculations of outcodes to be performed in a concurrent manner.

22 Claims, 8 Drawing Sheets

APPARATUS AND METHOD FOR DIRECT CALCULATION OF CLIP REGION

CROSS-REFERENCE TO RELATED APPLICATIONS

This is a continuation of a U.S. application Ser. No. 08/236,510 filed Apr. 28, 1994, now abandoned.

BACKGROUND OF THE INVENTION

1. Field of the Invention

The present invention relates to an apparatus and method for displaying graphic information. More specifically, the present invention relates to an apparatus for determining whether a multi-dimensional object requires clipping before being displayed on a two-dimensional screen and a method for performing such determination.

2. Art Related to the Invention

Over the last few years, a variety of computer graphic systems have been developed for generating and displaying two and three dimensional objects on a two-dimensional display screen (e.g., a cathode ray tube "CRT"), liquid crystal display ("LCD") and the like). These computer-generated objects may represent tangible or conceptual objects to assist the user in visualizing the object and analyzing various conditions such as, for example, aerodynamic forces exerted on a certain design of an aircraft wing, structural integrity of a new architectural structure and the like. In these and other instances, it is easier, safer and more cost effective to conduct experiments on these objects than building and testing prototypes.

To display an object onto a display screen, the computer system undergoes numerous operations. One such operation is performing a clip check to determine if any portions of the object are positioned outside a clipping region (i.e., clipping window) and thereby obscured from view. Currently, there exist a number of conventional clip checking techniques that have been developed. One of these techniques uses an encoded binary representation (i.e., an "outcode") to indicate a particular location of a desired point (i.e., a vertex) of the object to be displayed. See James D. Foley, Andries van Dam, Steven K. Feiner and John F. Hughes, *Computer Graphics Principles and Practice*, Second Edition (Pages 111–124 and 271–278) incorporated herein by reference.

The purpose of using outcodes is to rapidly determine whether an object is within the clipping window by calculating the outcode for each point of the object and thereafter, successively performing logical operations to determine a clip status for the entire object. The object is "trivially rejected" and is not displayed on a display screen of the computer if the object lies completely outside the clipping window. In contrast, the object is "trivially accepted" and displayed in its entirety if it lies completely within the clipping window. If the object is not "trivially rejected" or "trivially accepted", further analysis is required. This further analysis determines whether the object is outside the clipping window or is partially visible.

Figure 1A:
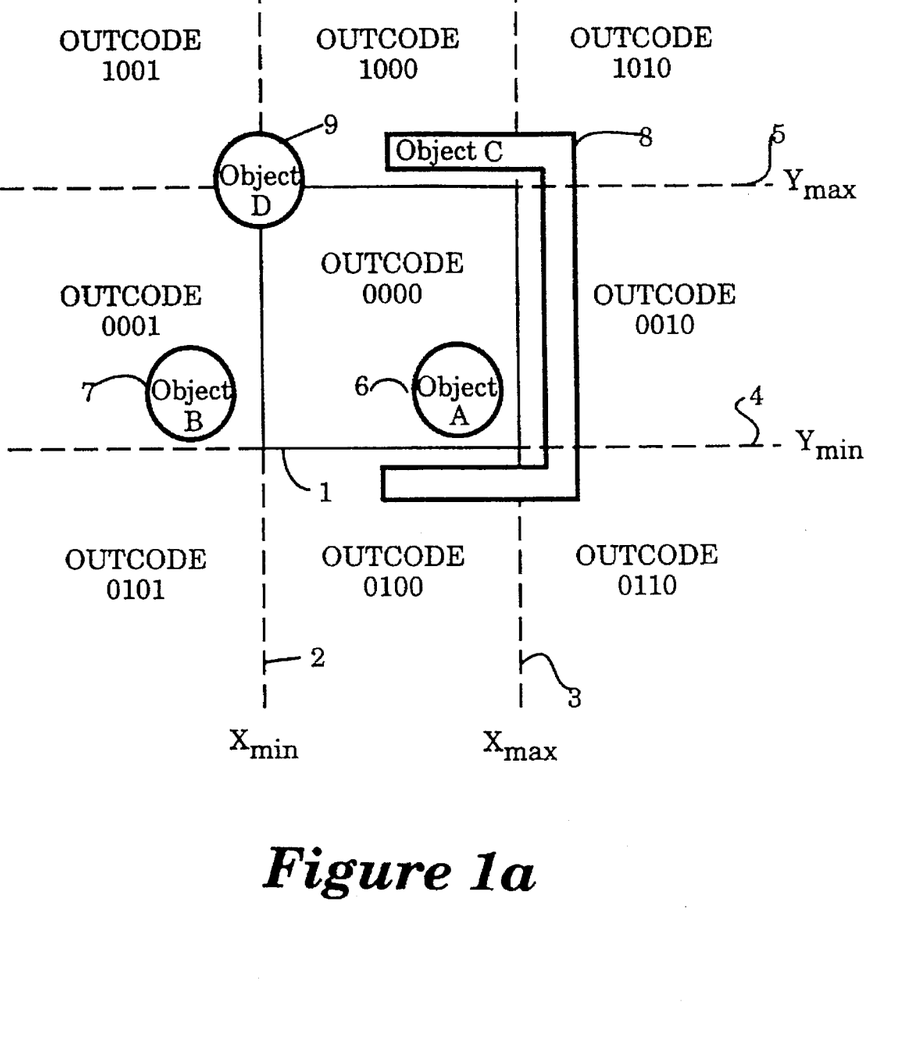
FIG. 1a is a plan view of the two-dimensional clipping window and its surrounding regions.

For example, in a two-dimensional case, a clipping window 1 is defined by four planar boundary constraints at $X_{min}$, $X_{max}$, $Y_{min}$ and $Y_{max}$ 2–5 as shown in FIG. 1a. In this example, four objects labeled A,B,C and D 6–9 are illustrated in which object A 6 is "trivially accepted" and object B 7 is "trivially rejected". In addition, objects C 8 and object D 9 require further analysis to determine whether the particular object is outside the clipping window (e.g., object C 8 ) or partially visible (e.g., object D 9).

Conventionally, as listed on Page 116 and inferred on Page 276 of *Computer Graphics Principles and Practice*, numerous conditional branches are used in determining outcodes used for clip checking. These conditional branches and comparisons are required to determine whether each point having two coordinates (X,Y) for a two-dimensional object or three coordinates (X,Y,Z) and a normalizing coordinate (W) for a three dimensional object is within the clipping window. The conventional process used to determine outcodes for points forming an object to be displayed is shown in pseudo-code in Table 1 below. Explicit constants as Arabic numbers are used rather than bit representations for the sake of clarity.

TABLE 1

| Conventional Two-Dimensional Outcode Algorithm |
|---|
| /* Operator Definitions */ <br> /* ("I") is a logical OR */ <br> /* ("&") is a logical AND */ <br> Outcode = "0"; <br> if (X < $X_{min}$), then Outcode = (Outcode I "1"); <br> if (X > $X_{max}$), then Outcode = (Outcode I "2"); <br> if (Y < $Y_{min}$), then Outcode = (Outcode I "4"); <br> if (Y > $Y_{max}$), then Outcode = (Outcode I "8"); |

Figure 1B:
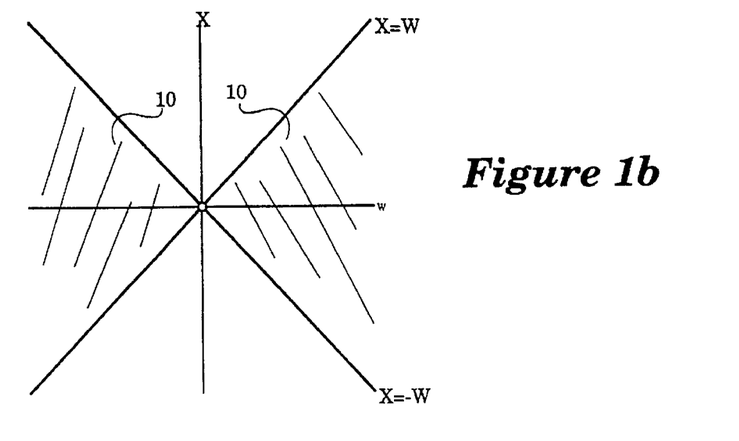
FIG. 1b is a plan view of the three-dimensional clipping window for a homogeneous X-coordinate.
Figure 1C:
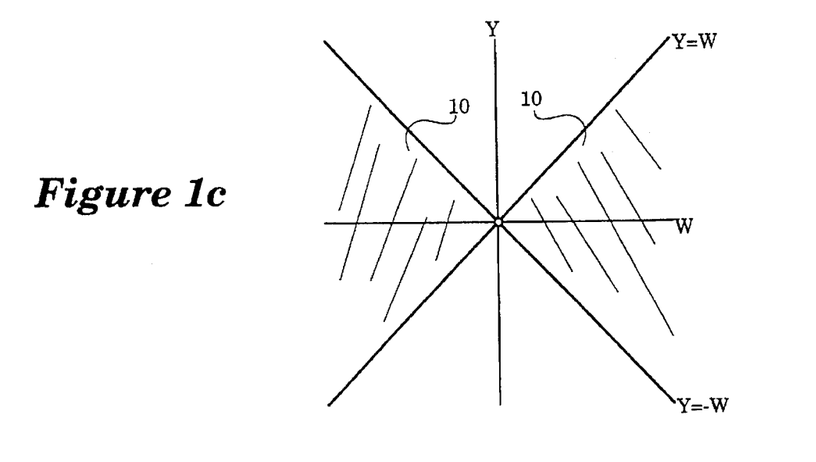
FIG. 1c is a plan view of the three-dimensional clipping window for a homogeneous Y-coordinate.
Figure 1D:
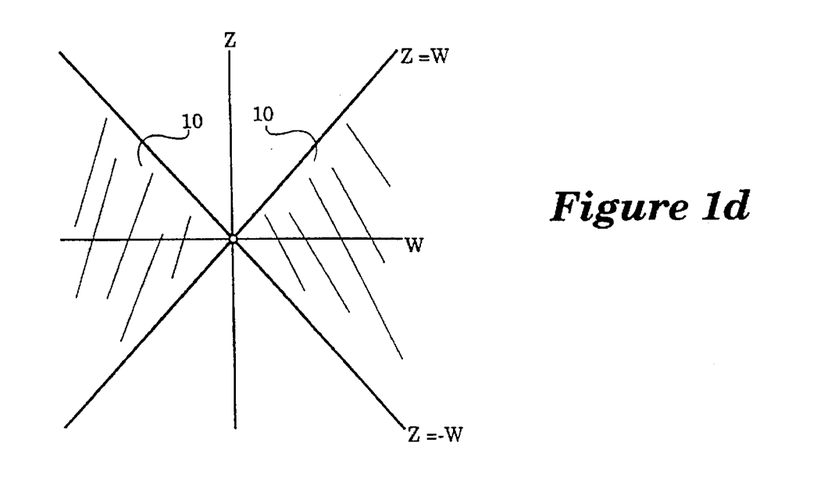
FIG. 1d is a plan view of the three-dimensional clipping window for a homogeneous Z-coordinate.

The conventional method for formulating outcodes for clip checking of three-dimensional objects is shown as pseudo-code in Table 2, wherein the method is generally similar in operation to the conventional two-dimensional process. The coordinate system is preferably in homogeneous coordinates (i.e., dividing X, Y, and Z coordinates by a normalizing coordinate (W) for efficiency reasons. As shown in FIGS. 1b–1d, a three-dimensional homogeneous clipping window 10 is defined by six planar boundary constraints at $-1 \leq X/W \leq 1$, $-1 \leq Y/W < 1$ and $-1 \leq Z/W \leq 1$, excluding the invalid case where X=0, Y=0, Z=0 and W=0. These outcodes for three dimensional objects are generally represented by six bits being a concatenation of two bits associated with each three dimensional coordinate (X, Y, Z).

TABLE 2

| Conventional Three-Dimensional Outcode Algorithm |
|---|
| /* Initialize the byte representing the Outcode */ <br> Outcode = "0"; <br> /* activate first or second bit of the Outcode */ <br> if (ABS(X) > W) <br>     if (X < 0), Outcode = (Outcode I "2"); <br>     else Outcode = (Outcode I "1"); <br> /* activate third or fourth bit of the Outcode */ <br> if (ABS(Y) > W) <br>     if (Y < 0), Outcode = (Outcode I "8"); <br>     else Outcode = (Outcode I "4"); <br> /* activate fifth or sixth bit of the Outcode */ <br> if (ABS(Z) > W) <br>     if (Z < 0), Outcode = (Outcode I "32"); <br>     else Outcode = (Outcode I "16"); |

Thereafter, to determine whether an object formed by a number of points is completely within the clipping window ("trivial accept"), or completely outside the clipping window ("trivial reject"), logical operations are applied to the outcode of those points. The object is trivially accepted if the outcodes of each of the points are logically OR'ed (i.e., a bit-by-bit OR) together to form a resultant outcode and every bit of the resultant outcode is equal to "zero". However, the object is trivially rejected if the outcodes of the points are bit-by-bit logically AND'ed together to form a resultant outcode and any bit of the resultant outcode is "non-zero". Otherwise, further analysis is needed.

In typical applications, nearly all of the objects displayed will be trivially rejected or accepted. The number of objects that require further analysis is usually in the range of 1%–10% of the objects displayed. Thus, maximizing the performance of the trivial accept and reject stages are of utmost importance in maximizing the performance of the entire display process. Unfortunately, there exist a number of disadvantages associated with the conventional clip checking scheme.

One disadvantage is that a software implementation of the conventional clip checking mechanism operates at an extremely slow rate, thereby failing to optimally utilize high processing speeds of current and next generation processors. This slow rate is due to the use of Boolean conditional branch instructions. Hence, it would be desirous to develop a new clip checking scheme using an outcode representation but eliminating Boolean conditional branch instructions so as to enhance clip checking and overall display performance.

A second disadvantage is that the conventional clip checking mechanism relies on a floating point unit within the processor of the computer system to perform coordinate transformations on the object as well as to calculate its outcode value in a concurrent fashion. The floating point unit is implemented to be responsible for transformations and clip checking operations because previously, the delay caused by the floating point unit was merely a small percentage of the total time delay in displaying an object on a display device. Thus, any inefficiency with respect to the clip checking scheme had negligible effect on the computer system's performance. However, with the advent of faster processors and more advanced graphic hardware, the clip checking causes a greater percentage of the total time delay and has a more pronounced effect on the overall performance of the computer system. Hence, it would be desirous to interleave the transformation operations and the outcode calculations in order to improve overall system performance.

BRIEF SUMMARY OF THE INVENTION

Since the delay in performing clip checking has a greater effect on overall performance of the computer system in displaying objects, it is apparent that there exists a need for an apparatus and method for reducing processing time in calculating outcodes in a clip checking scheme to optimize overall system performance. Accordingly, the present invention is an apparatus and method for calculating outcodes directly from an integral representation of a floating point number defining a certain coordinate of a point of an object to be displayed and for performing bit manipulations of the integral representation for ascertaining its position relative to the clipping window.

As a result, an integer unit of the processor is generally dedicated to calculating outcodes while a floating point unit within the processor is still generally dedicated to transforming the object into viewing parameters. This different dedication enables transformations and outcode calculations to be performed concurrently thereby enhancing overall system performance. Moreover, these outcode calculations under software control are applied by the integer unit absent of any Boolean conditional branch instructions which impede system performance.

BRIEF DESCRIPTION OF THE DRAWINGS

The features and advantages of the present invention will become apparent from the following detailed description of the present invention in which.

DETAILED DESCRIPTION OF THE INVENTION

A. Notation and Nomenclature

The detailed description which follows is presented largely in terms of algorithms and symbolic representations of operations of data bits within a computer system. An algorithm is generally conceived as a self-consistent sequence of steps leading to a desired result. These steps require physical manipulation of physical quantities. Usually, but not necessarily, these quantities are electrical or magnetic signals, conveniently referred to as "bits", are capable of being stored, transferred, compared, combined or otherwise manipulated as illustrated through symbolic representations such as a logical AND ("&") or a logical OR ("|"). These algorithms and symbolic representations are the means used by those skilled in the computer graphics art to most effectively convey the essence of their work to others skilled in the art.

Further, the manipulations performed are often referred to in terms such as adding, comparing, complementing, etc. which are commonly associated with mental operations performed by the user. However, in the present case, these manipulations are machine operations. Useful machines for performing the operations of the present invention generally include digital computers or other similar devices. The present invention relates to a method for operating a computer and processing electrical or other physical signals to generate other desired physical signals for quickly determining an outcode to indicate whether clipping is required for an object to be displayed.

B. Detailed Description

In the following detailed description, numerous details are set forth such as specific components in a computer system employing the present invention, outcode bit representations and the like in order to provide a thorough understanding of the present invention. However, it is apparent to one skilled in the art that the present invention may be practiced without these specific details.

Figure 2:
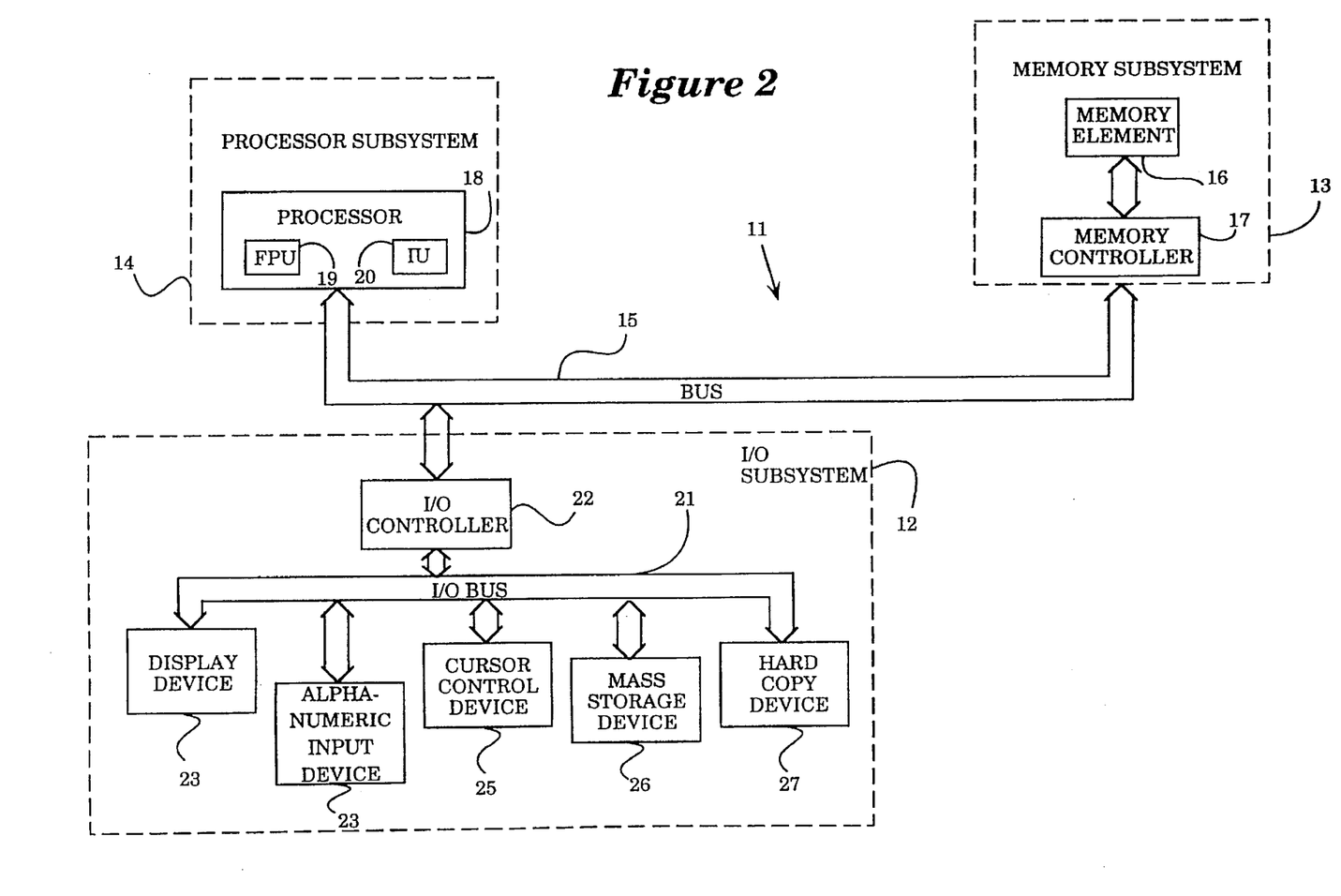
FIG. 2 is a block diagram of a computer system executing software employing the present invention.

Referring to FIG. 2, a typical computer system 11 supporting graphics and incorporating the teachings of the present invention is illustrated. The computer system 11 comprises an input/output ("I/O") subsystem 12, memory subsystem 13, and a processor subsystem 14. A bus 15 enables information to be communicated between these subsystems forming the computer system 11. As illustrated, the memory subsystem 13 includes at least one memory element 16 such as dynamic random access memory ("DRAM"), read only memory ("ROM"), video random access memory ("VRAM"), etc. The memory element 16 is used to store information in a program teaching the present invention, data and other information for use by the processing subsystem 14. The memory subsystem 13 may include a memory controller 17 (as shown) being an interface between the processing subsystem 14 and the memory element 16 to control access thereto.

The processing system 14 comprises at least one processor 18, such as a RISC processor, which includes a floating point unit ("FPU") 19 to perform floating point calculations and an integer unit ("IU") 20 to perform integer calculations. The processing system 14 processes information from the I/O or memory subsystems 12 and 13, respectively. It is contemplated, however, that multiple processors could be implemented into the processing system 14 to provide enhanced processing capabilities.

As further shown in FIG. 2, the I/O subsystem 12 comprises an I/O bus 21 coupled to the bus 15 directly or indirectly through an I/O controller 22 acting as an interface between the I/O bus 21 and the bus 15. The I/O subsystem 12 provides a communication path for the computer system 11 to receive inputted information from and to transmit information to peripheral devices coupled to an I/O bus 21 including, but not limited to a two-dimensional display device 23 (e.g., cathode ray tube, liquid crystal display "LCD", etc.) for displaying objects; an alphanumeric input device 24 (e.g., an alphanumeric keyboard, etc.) for communicating information and command selections to the processing subsystem; a cursor control device 25 (e.g., a mouse, track ball, etc.) for controlling placement of the object or windows; a mass data storage device 26 (e.g., magnetic tapes, hard disk drive, floppy disk drive, etc.) for storing information and instructions; and a hard copy device 27 (e.g., plotter, printer, etc.) for providing a tangible, visual representation of the object.

Figure 3:
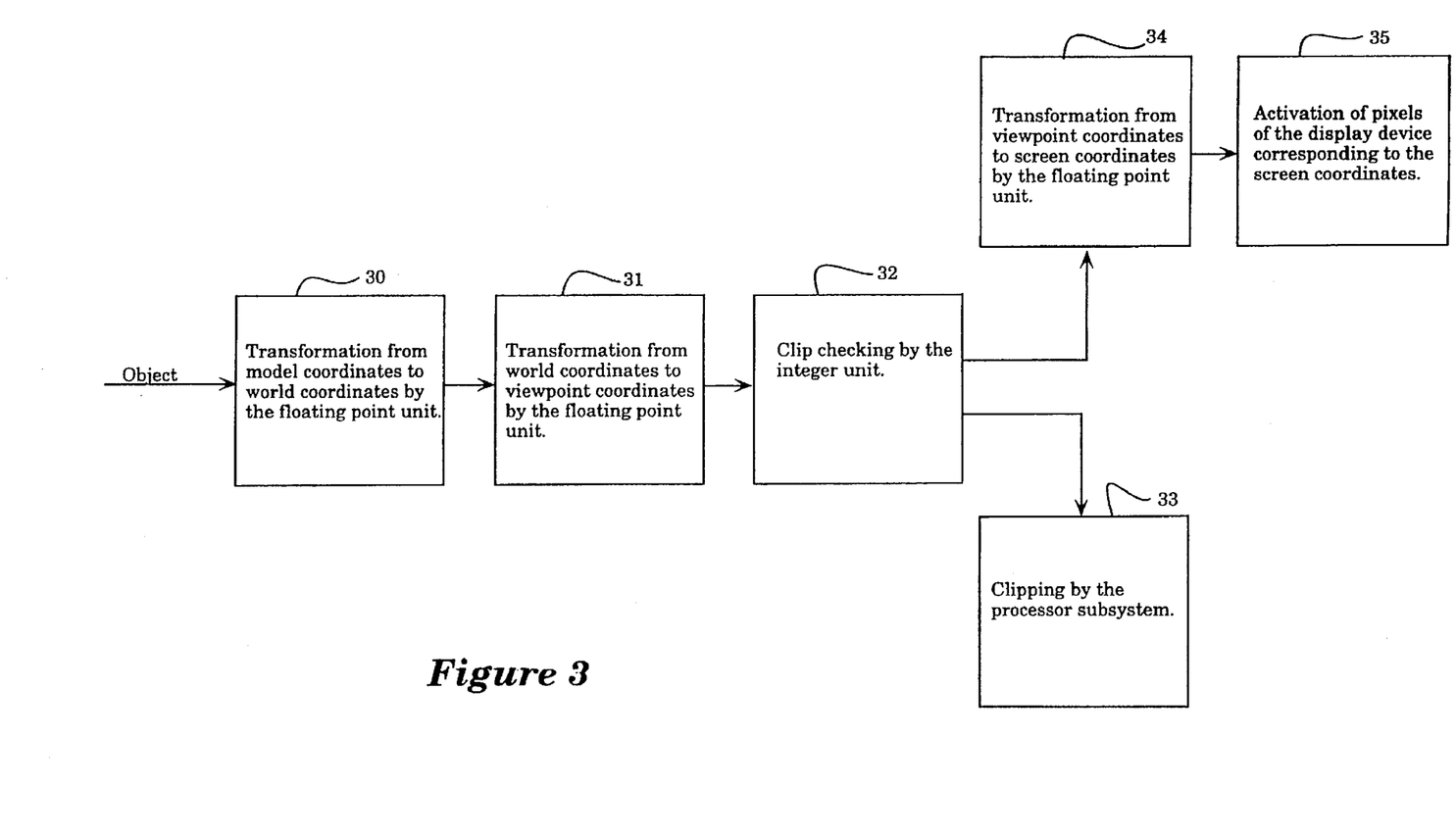
FIG. 3 is a block diagram of the operations performed by the computer system after generation of the object to display the object on a display device.

It is well known that an object needs to be transformed into different viewing parameters in order to display the object onto the display device. Such transformations are usually accomplished by the processor subsystem and occasionally in combination with graphic acceleration hardware. As shown in FIG. 3, a first operation 30 by the processing subsystem, notably the FPU, is to transform a pre-defined object from model coordinates into world coordinates by multiplying each point of the object by a first transformation matrix. In world coordinates, the pre-defined object is placed in its typical position in space by properly rotating and scaling the object.

Figure 4A:
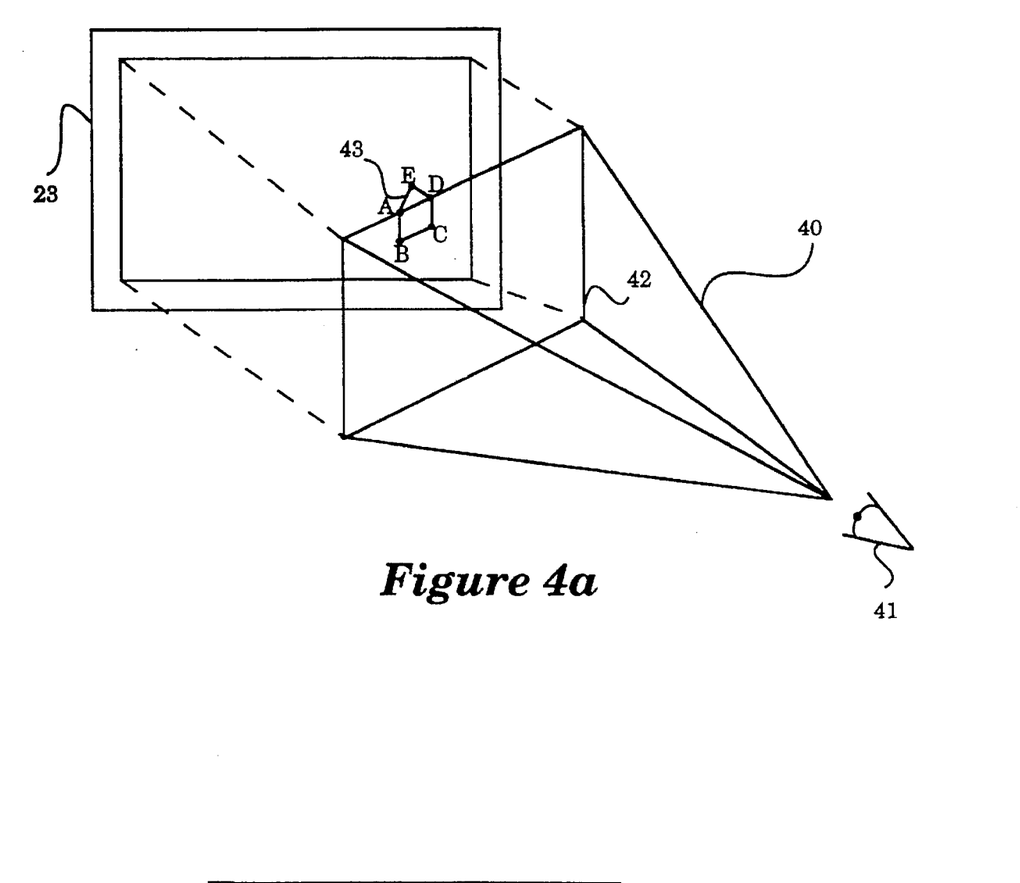
FIGS. 4a is a perspective view of an object within a viewing pyramid.
Figure 4B:
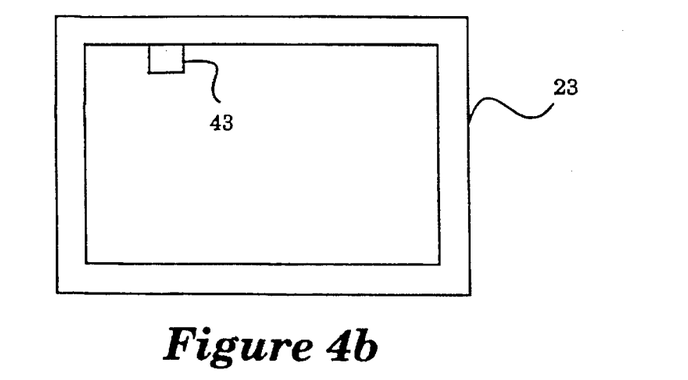
FIGS. 4b is a perspective view of the object by the display device.
Figure 5A:
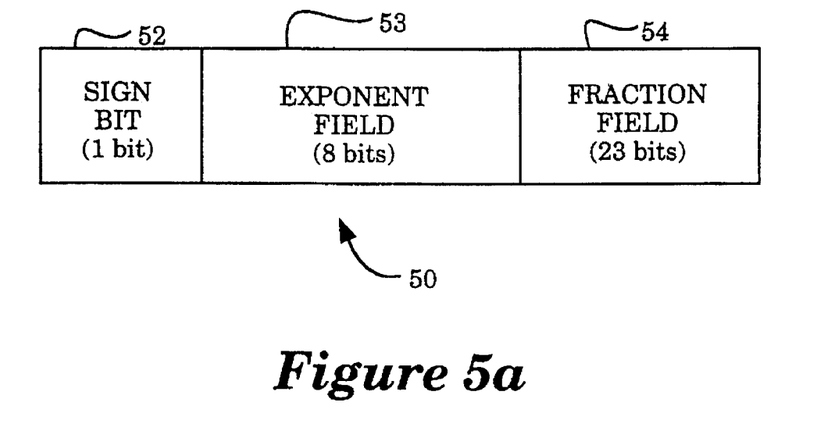
FIG. 5a is a block diagram view of a 32-bit IEEE standard floating point number used to represent a coordinate of a point.
Figure 5B:
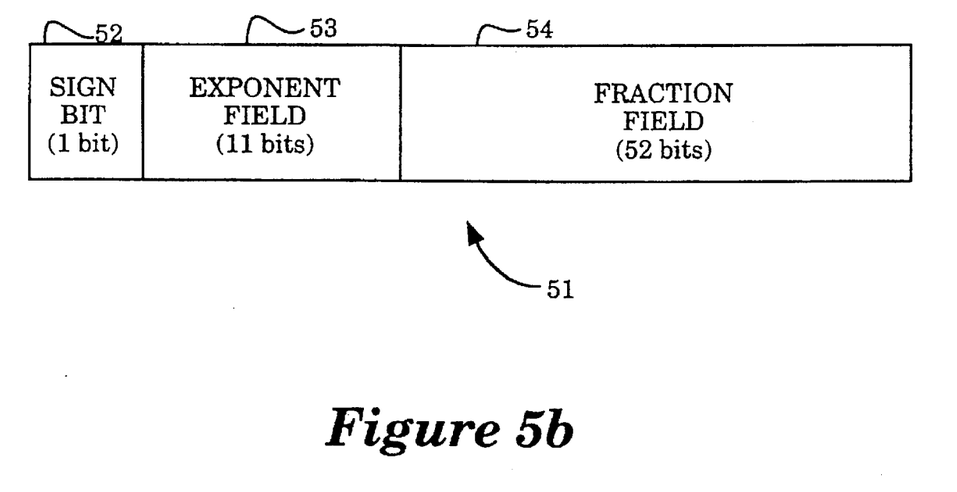
FIG. 5b is a block view of 64-bit IEEE standard floating points number used to represent a coordinate of a point.

A subsequent operation 31 is performed by the FPU which transforms the object into well-known viewpoint coordinates which has its origin fixed at a viewpoint of the user. Such transformation is accomplished by multiplying each point of the object by a second transformation matrix. The viewpoint coordinates are shown in FIGS. 4a and 4b, in which a viewing pyramid 40 denotes the chosen viewpoint of the user with respect to the display device 23. A user's eye 41 forms an apex of the viewing pyramid 40 in which its base 42 corresponds to a viewing surface of the display device 23. A plurality of points (i.e., vertices) denoted by the letters A–E forming a multiple-line object are illustrated. Each of the points A–E has coordinates represented through a standard IEEE single precision floating point representation for a 32-bit processor (as seen in FIGS. 5a) or a standard IEEE double precision floating point representation for a 64-bit processor (as seen in FIGS. 5b). These points A–E are visible to the user's eye 41 when disposed within the viewing pyramid 40. Thus, those vertices disposed within the viewing pyramid 40 (A–D) are displayed on the display device 23. Correspondingly, in this example, one of the vertices (E) falling outside the viewing pyramid 40 is not visible to the user's eye 41 and thus, is clipped (i.e., not displayed) in accordance with any conventional clipping algorithm.

Referring back to FIG. 3, although the first two operations are illustrated as separate operations, they may be combined into a single operation by multiplying each point of the object by a third transformation matrix being a function of the first and second transformation matrices. After the points comprising the object have been transformed into viewpoint coordinates, the processing subsystem performs a third operation i.e. a clipping check 32 to determine which portions of the object are completely visible, obscured from view or partially visible in accordance with boundary constraints forming a clipping window based on the chosen viewpoint. The points of the object which exceed the prescribed boundary limit defined by the clipping window, such as point E of FIG. 4b, are removed (i.e., undergo a clipping operation 33) and are not shown on the display screen.

After the object has undergone the clip checking operation 32, the FPU performs a third transformation 34 by converting those points in viewpoint coordinates within the clipping window into screen coordinates which maps the display pyramid to corresponding locations in the display device. Thereafter, the processing subsystem and preferably graphic acceleration hardware performs a final operation 35 by activating those pixels of the object corresponding to those points within the clipping window.

In analyzing the clip checking scheme, one must first recognize the bit representation of the vertices forming the objects. As shown in FIGS. 5a and 5b, the points forming the object to be displayed are represented as standard IEEE floating point numbers 50 or 51 having a bit pattern consisting of three fields; namely, a sign bit("s") 52 of the IEEE floating point number, an exponent field ("e") 53, and a fraction field ("f") 54. For single-precision floating point numbers 50, the exponent and fraction fields 53 and 54 include eight and twenty-three bits, respectively. For double-precision floating point numbers 51, the exponent field 53 is eleven bits while the fraction field 54 is fifty-two bits in size.

Typically, as previously shown in Table 2, a conventional clip checking algorithm for three-dimensional objects performs between three and six Boolean conditional branch instructions (some instructions being nested) as well as three or four absolute value operations to obtain the outcode of a chosen point of the object to be displayed. The outcode generally pertains to a homogeneous coordinate system (X,Y,Z,W). These Boolean conditional branch instructions are generally comparisons between the coordinates of the point as floating point numbers and the boundary constraints of the three-dimensional clipping window.

Unlike the conventional checking mechanism, the present invention determines whether the point is visible or hidden with respect to the clipping window by treating the floating point representation of the point as a two's complement integer and using its bit pattern rather than its specific floating point value to provide information regarding the positioning of the vertices. As a result, outcodes are now calculated by the IU so that transformations by the FPU and outcode calculations can operate in a concurrent fashion. The present invention focuses on analysis of a sign bit of certain integral representations and/or differences between certain integral representations so that Boolean conditional branch instructions are eliminated from outcode calculations.

The outcode used for three-dimensional clipping is six or seven bits. The six bit outcode representation is similar to that described in Page 271 of *Computer Graphics Principles and Practice*. The seven bit outcode representation is used when objects with W<0 are to be considered visible. See Page 276 of *Computer Graphics Principles and Practice*. The following discussion is based on the assumption that a three-dimensional clipping window is symmetrical and defined in normalized terms by $-1 \leq X/W, Y/W, Z/W \leq 1$ and discusses a seven bit code. The operations for calculating a six bit outcode are identical to those operations for calculating the seven bit, except that there are no calculations which require an absolute value of $W_{int}$ because, in the usual case, all visible points of the object have W>0. Thus, for calculating a six-bit outcode, the following discussed steps would be used except for steps 206–207 (see FIG. 6) and the integral value of $W_{int}$ would be substituted for those calculations using $ABS(W_{int})$.

Figure 6:
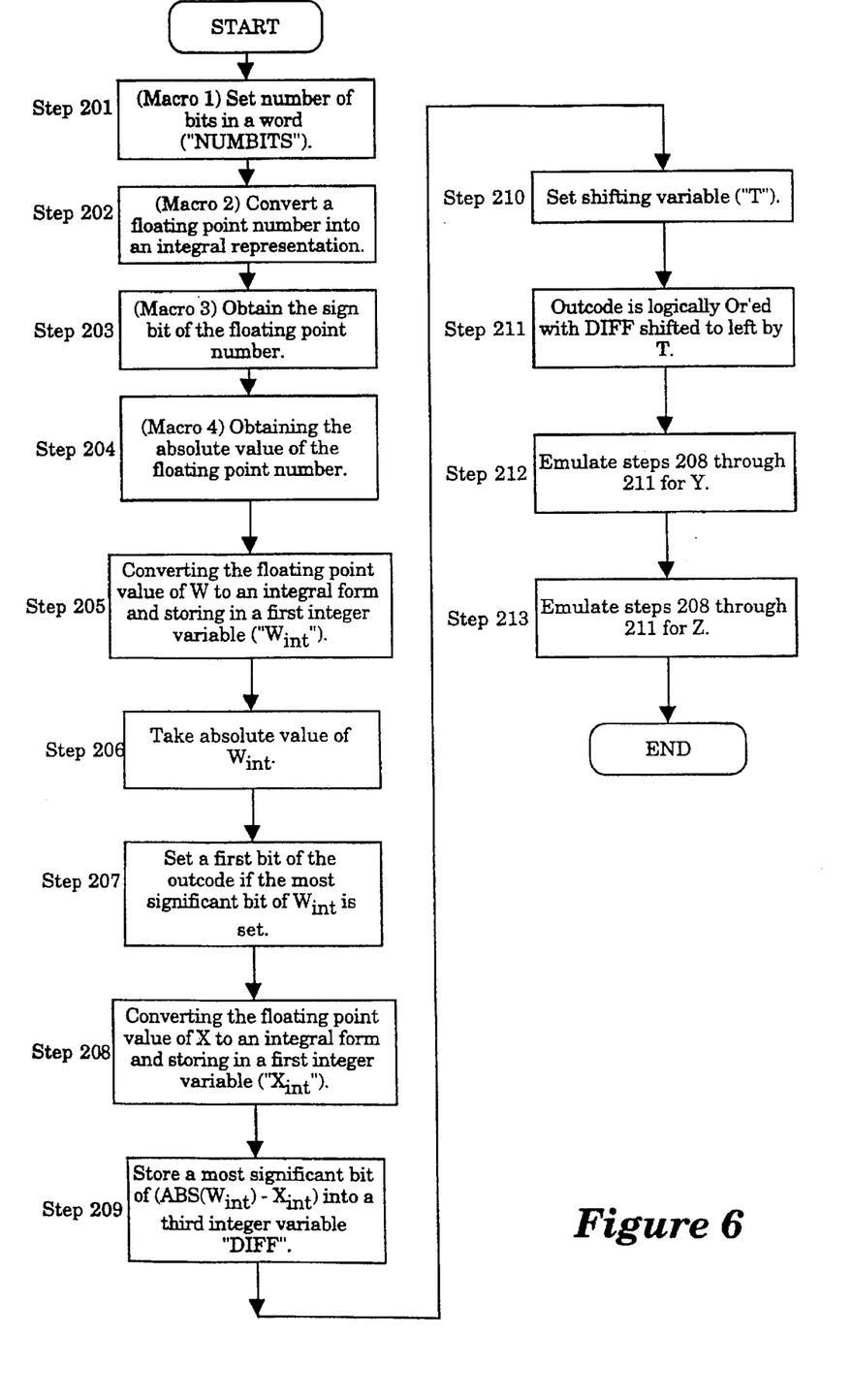
FIG. 6 is a flowchart outlining the steps in the present invention for determining a seven bit outcode for a three-dimensional object.

Referring to FIG. 6, the determination of outcodes primarily by the IU is accomplished through steps 201–213. First, a number of macros are defined. A first macro is defined to obtain the number of bits in a word ("NUMBITS") according to capabilities of the processor (Step 201). For example, a 32-bit word is chosen for a 32-bit processor. This step is performed so that an integral representation of a floating point number (i.e., its bit pattern as an integer) corresponds in bit size to the processor. Next, in Step 202, a second macro is defined for converting a floating point number into its integral form. The reasons for such conversion is that integer calculations are faster than floating point calculations and such conversion permits a FPU within the processor to be used for other calculations while the IU performs the below calculations (i.e., interleaving coordinate transformations of one point with outcode calculation of another point). Thereafter, in step 203, a third macro is defined to obtain a sign bit of the floating point number converted to integral form. The sign bit is obtained by logically shifting the integral representation to the right by NUMBITS-1. A final macro is defined to obtain an absolute value of the floating point number in integral form by clearing its sign bit (Step 204). It is contemplated that these macro formats are provided for optimizing computational speed and ease in coding and therefore, could be excluded in favor of more coding.

In Step 205 a normalizing coordinate W of the point (X,Y,Z,W), being a floating point number, is converted by the processor to integral form to preserve its bit pattern and then stored in a first integer variable ("$W_{int}$"). Thereafter, an absolute value of $W_{int}$ ("$ABS(W_{int})$") is taken for subsequent bit manipulation by the IU (Step 206), although this step may not be necessary as discussed above. Since the point is not visible when having a negative normalizing coordinate W, a first outcode bit is activated (i.e. set), normally by an electrical signal generated from the processor (namely, the IU), when a sign bit of $W_{int}$ is set. Otherwise, the first outcode bit is zero (Step 207).

The next determination is whether a first coordinate ("X") of the point is within the three-dimensional clipping window. First, similar to the above calculations for W, X is converted to integral form by the processor to preserve its bit pattern and then stored in a second integer variable ("$X_{int}$") (Step 208). As shown in the pseudo code of Table 2, a second or third outcode bit is set if $ABS(X)>ABS(W)$, depending on X's value. Thus, in Step 209, by storing the sign bit of the difference between the absolute value of $W_{int}$ and $X_{int}$ into a third integer variable ("DIFF"), DIFF now has a value of "1" if $ABS(W_{int})-ABS(X_{int})$ is negative or a "0" otherwise. A shifting variable ("T") is set to be equal to 1 or 2, depending on whether a sign bit of $X_{int}$ is 0 or 1, respectively (Step 210). Thereafter, DIFF experiences a logical shift to the left by T so that the IU generates an electrical signal cooresponding to the second or third bits of the outcode in order to activate the same. DIFF is bit-by-bit logically OR'ed with the outcode to preserve outcode bits that have been set already for the point by the IU (Step 211).

Thereafter, as illustrated in the pseudo-code using C language in Table 3 below, similar calculations are performed for a second ("Y") and third ("Z") coordinates (Steps 212 and 213), noting that different values of the shifting variable are used so that the IU can properly activate electrical signals for activating the necessary bits of the outcode.

After the calculations are completed for the X,Y,Z,W coordinates, the outcode now designates that the point is displayable if none of the bits of the outcode are set. The above process may be repeated for each point of the object to be displayed to primarily determine if the object can be displayed in its entirety or is not displayable (i.e., trivially accepted or rejected). If the object is displayable in its entirety, the object is displayed on the display device without undergoing any clipping algorithms as discussed above.

TABLE 3

Direct Calculation of Seven Bit Outcodes

```
/* Additional Operator Definitions
        "<<x" is a binary left shift by "x" operator.
        "~" is a logical complement operator
/* number of bits in a word */
#define NUMBITS         size (long)*8
/* Obtain the integral form of a floating point number */
#define v(X)            *(long *) &(X)
/* Obtain the sign of an integer as a value 0 or 1 */
#define s(X)            (((unsigned long ) (X)) >> (NUMBITS-1))
/* Obtain the absolute value of the floating point number in integral
form */
#define ABS(X)          ((X) & ~(1 << (NUMBITS-1)))
W_int = v(W);
```

TABLE 3-continued

Direct Calculation of Seven Bit Outcodes

```
abs_w = ABS(W_int);
outcode = S(W_int);          /* 0 or 1 per W's sign */
X_int = v(X);
DIFF = s(abs_w - ABS(X_int));
T = S(X_int) + 1;
outcode = outcode | (DIFF << T);   /* 0, 4, or 2 OR'ed with outcode */
Y_int = v(Y);
DIFF = s(abs_w - ABS(Y_int));
T = S(Y_int) + 3;
outcode = outcode | (DIFF << T);   /* 0, 16, or 8 OR'ed with outcode */
Z_int = v(Z);
DIFF = s(abs_w - ABS(Z_int));
T = s(Z_int) + 5;
outcode = outcode | (DIFF << T);   /* 0, 64 or 32 OR'ed with outcode */
```

Figure 7:
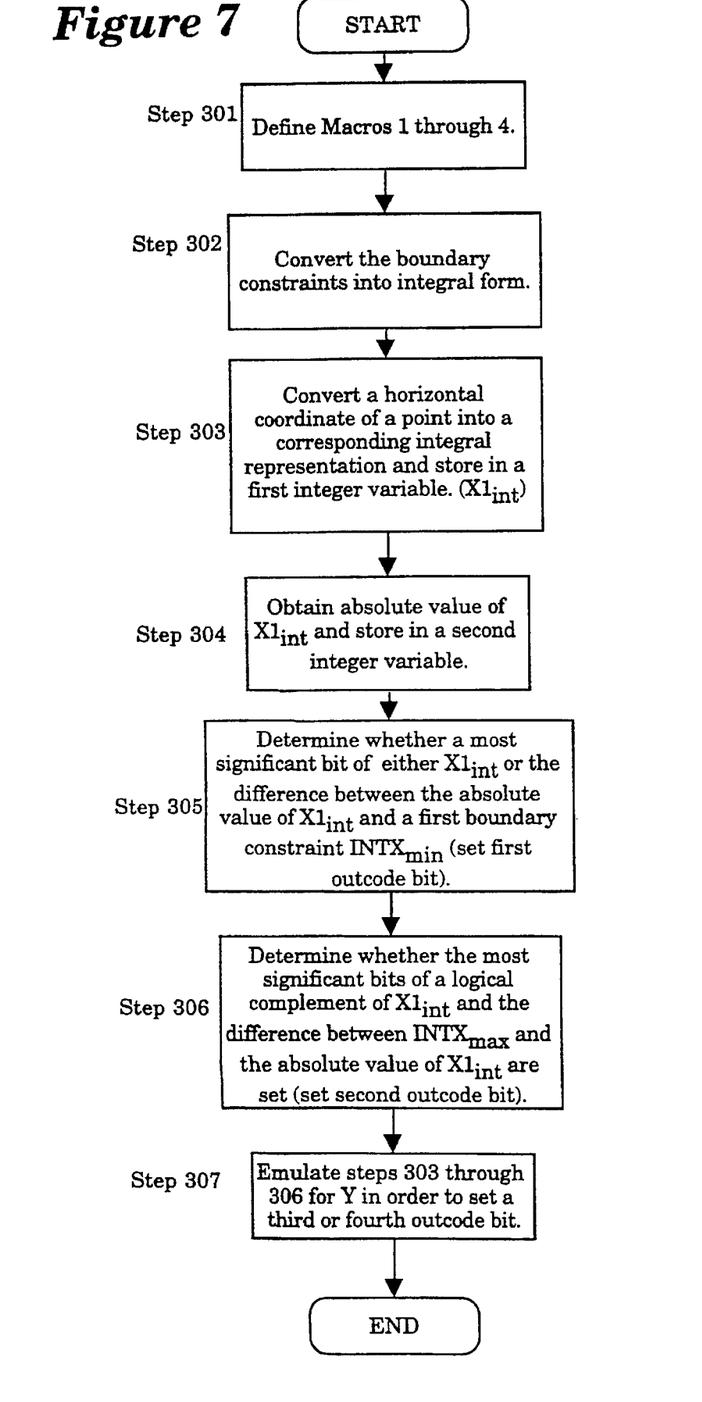
FIG. 7 is a flowchart outlining the steps in performing the present invention for determining a four bit outcode for a two-dimensional objects.

Similar to the steps for determining the outcodes for vertices in three-dimensions, by analyzing a sign bit for each result of a particular logical operation, conditional branches may again be eliminated for two-dimensional objects as shown in FIG. 7. First, as discussed above, a number of macros are defined such as, for example, (i) converting a floating point number into its integral form; (ii) obtaining a sign bit of the floating point number converted to integral form; and (iii) obtaining an absolute value of the floating point number in integral form. As previously stated, the computations associated with these macros and not the macros themselves are necessary to the present invention.

Since clipping windows are typically oriented in a positive manner (i.e., $0 \leq X_{min} \leq X_{max}$; $0 \leq Y_{min} \leq Y_{max}$), the conventional outcode calculations illustrated in pseudo-code of Table 1 are equivalent to the following where "AND" is a conditional AND and "OR" is a conditional "OR".

(1) if ((X<0 AND X<$X_{min}$) OR (X$\geq$0 AND X<$X_{min}$)), then set first bit of the outcode;

(2) if ((X<0 AND X>$X_{max}$) OR (X$\geq$0 AND X>$X_{max}$)), then set the second bit of the outcode;

(3) if ((Y<0 AND Y<$Y_{min}$) OR (Y$\geq$0 AND Y<$Y_{min}$)), then set the third bit of the outcode;

(4) if ((Y<0 AND Y>$Y_{max}$) OR (Y$\geq$0 AND Y>$Y_{max}$)), then set the fourth bit of the outcode.

In view of the fact that $X_{min}$, $X_{max}$, $Y_{min}$, $Y_{max} \geq 0$, the above can be simplified to the following equations:

(1) if ((X<0) OR (X$\geq$0 AND X<$X_{min}$)), then set first bit of the outcode;

(2) if (X$\geq$0 AND X<$X_{max}$), then set the second bit of the outcode;

(3) if ((Y<0) OR (Y$\geq$0 AND Y<$Y_{min}$)), then set the third bit of the outcode;

(4) if (Y$\geq$0 AND Y>$Y_{max}$), then set fourth bit of the outcode.

Thus, in reducing the equations to employ absolute values, the equations become.

(1) if ((X<0) OR (ABS(X)<$X_{min}$)), then set first bit of the outcode;

(2) if (X$\geq$0 AND ABS(X)>$X_{max}$), then set the second bit of the outcode;

(3) if ((Y<0) OR (ABS(Y)<$Y_{min}$)), then set the third bit of the outcode;

(4) if (Y$\geq$0 AND ABS(Y)>$Y_{max}$), then set fourth bit of the outcode.

After the macros (if used) are defined (Step 301), the boundary constraints forming the clipping window, namely $X_{min}$, $X_{max}$, $Y_{min}$, $Y_{max}$, are stored in integral form as $INTX_{min}$, $INTX_{max}$, $INTY_{min}$, $INTY_{max}$ (Step 302). In Step 303, a horizontal coordinate X1 of the first point (X1,Y1), being a floating point number, is converted to integral form preserving its bit pattern and then stored in a first integer variable ("$1_{int}$"). Thereafter, an absolute value of $X1_{int}$ is taken ("ABS($X1_{int}$") and stored in a second integer variable for subsequent bit manipulation by the IU (Step 304). In Step 305, a determination is made if a sign bit of either $X1_{int}$ or a difference between ABS ($X1_{int}$) and a first boundary constraint $INTX_{min}$ is "1" (i.e., set) which indicates that X1 is outside the clipping window. More specifically, if either sign bit is set, then a first bit of the outcode is set by the processor, more specifically the IU, generating an electrical signal to activate the first bit of the outcode because X1<0 or ABS ($X1_{int}$)<$INTX_{min}$ both indicating that X1 is outside the clipping window.

In Step 306, a second determination is made as to whether the sign bits of both a logical complement of $X1_{int}$ (~$X1_{int}$) and the difference between an integral value of the second boundary constraint $INTX_{max}$ and ABS ($X1_{int}$) is set. If so, the second bit of the outcode is set by the IU because the sign bit of the logical complement of $X1_{int}$ is set when $X1_{int}$>0 and $INTX_{max}$-ABS ($X1_{int}$)<0 when ABS ($X1_{int}$)>$INTX_{max}$ indicating that X1 it is outside the clipping window. The same procedure (Step 307) as above is followed for a vertical coordinate ("Y1") of the first point to determine the final outcode value since the outcode is successively logically OR'ed. The outcode is then used normally in the clip checking mechanism to indicate whether the point is outside the clipping window and multiple outcodes can be used to determine whether portions of the object joining two vertices is trivially accepted (bit-by-bit logical OR of both outcodes resulting in zero), trivially rejected (bit-by-bit logical AND of both outcodes resulting in a non-zero number) or requires clipping. The calculations of these outcodes are illustrated in Table 4 below.

TABLE 4

Direct Calculation of Outcode for Two-Dimensional Objects

```
/* Define macros NUMBITS, v(X), s(X) and ABS(X) */
/* These values typically would be calculated once and cached */
INTX_min = v(X_min);
INTX_max = v(X_max);
INTY_min = v(Y_min);
INTY_max = v(Y_max);
/* Obtain the bits and absolute value */
X_int = v(X);
```

TABLE 4-continued

Direct Calculation of Outcode for Two-Dimensional Objects

```
ax = ABS(X_int);
/*Place the sign bit in a first bit the outcode */
outcode = s(X_int | (ax –INTX_min));
/* Place the sign bit in a second bit of the outcode*/
outcode = outcode | s(~X_int & (ixmax – ax)) << 1;
/* Perform the same operations for Y */
Y_int = v(Y);
ay = ABS(Y_int);
/* Place the sign bit in a third bit of the outcode*/
outcode = outcode | s(Y_int | (ay – INTY_min)) << 2;
/* Place the sign bit in a fourth bit of the outcode*/
outcode = outcode | s(~Y_int & (INTY_max – ay)) << 3;
```

The present invention described herein may be designed in many different methods and using many different configurations. While the present invention has been described in terms of various embodiments, other embodiments may come to mind to those skilled in the art without departing from the spirit and scope of the present invention. The invention should, therefore, be measured in terms of the claims which follows.

What is claimed is:

1. A method for performing coordinate transformations concurrently with a clip checking scheme using an outcode in order to determine a position of at least a first point of a multi-dimensional object with respect to a clipping window having a plurality of boundary constraints, the clipping window being generated by a computer system comprising a display device and a processor including a floating point unit and an integer unit, the method comprising the steps of:

converting by said processor of a first coordinate of said first point from a floating point representation having a first bit pattern into an integer representation preserving said first bit pattern;

calculating by said integer unit whether said first coordinate is outside said clipping window through analysis of said first bit pattern and said plurality of boundary constraints;

converting by said processor of a second coordinate of said first point from a floating point representation having a second bit pattern into an integer representation preserving said second bit pattern;

calculating by said integer unit whether said second coordinate is outside said clipping window through analysis of said second bit pattern and said plurality of boundary constraints; and displaying said first point by said display device if said first point is within said clipping window.

2. The method according to claim 1, wherein the step of calculating whether said first coordinate is outside said clipping window comprises the steps of:

determining whether a most significant bit of said first bit pattern is set, said most significant bit being a sign bit of said integer representation of said first coordinate;

determining whether a most significant bit of a first result is set wherein said most significant bit of said first result is a sign bit, said first result being a difference between an absolute value of said integer representation of said first coordinate and an integer representation of a first boundary constraint of said plurality of boundary constraints; and setting a first bit of said outcode by said integer unit to indicate that said first point is outside the clipping window if either said sign bit of said integer representation of said first coordinate is set or said most significant bit of said first result is set.

3. The method according to claim 2, wherein the step of calculating whether said first coordinate is outside said clipping window further comprises the steps of:

determining whether a most significant bit of a logical complement of said integer representation of said first coordinate is set said most significant bit being a sign bit of said logical complement;

determining whether a most significant bit of a second result is set, said most significant bit of said second result being a sign bit of said second result, said second result being a difference between an integer representation of a second boundary constraint of said plurality of boundary constraints and said integer representation of said first coordinate; and setting a second bit of said outcode by said integer unit to indicate that said first point is outside the clipping window if said sign bit of said logical complement of said integer representation of said first coordinate is set and said sign bit of said second result is set.

4. The method according to claim 1, wherein the step of calculating whether said second coordinate is outside said clipping window comprises the steps of:

determining whether a most significant bit of said integer representation of said second coordinate is set, said most significant bit being of said integer representation;

determining whether a most significant bit of a third result is set, said most significant bit of said third result being a sign bit, said third result being a difference between an absolute value of said integer representation of said second coordinate and an integer representation of a third boundary constraint of said plurality of boundary constraints; and setting a third bit of said outcode by said integer unit to indicate that said first point is outside the clipping window if either said sign bit of said integer representation of said second coordinate is set or said sign bit of said third result is set.

5. The method according to claim 4, wherein the step of calculating whether said second coordinate is outside said clipping window further comprises the steps of:

determining whether a most significant bit of a logical complement of said integer representation of said second coordinate is set, said most significant bit being of a sign bit of said logical complement;

determining whether a most significant bit of a fourth result is set, said most significant bit of said second result being a sign bit, said fourth result being a difference between an integer representation of a fourth boundary constraint of said plurality of boundary constraints and said integer representation of said second coordinate; and setting a fourth bit of said outcode by said integer unit to indicate that said first point is outside the clipping window if both said sign bit of said logical complement of said integer representation of said second coordinate is set and said sign bit of said fourth result is set.

6. The method accordingly to claim 5, wherein prior to the displaying step, said method further comprises the steps of:

converting a third coordinate of said first point from its floating point representation having a third bit pattern into an integer representation preserving said third bit pattern; and calculating by said integer unit whether said third coordinate is outside said clipping window and setting a third bit of said outcode if said third coordinate is outside said clipping window.

7. The method according to claim 6, wherein prior to the step in converting said first coordinate of said first bit pattern, said method further comprises the steps of:

converting a normalizing coordinate associated with said first point from its floating point representation having a fourth bit pattern into an integer representation preserving said fourth bit pattern; and setting a fifth bit of said outcode if a sign bit of said fourth bit pattern is set.

8. The method according to claim 7, wherein prior to the step of converting of the first coordinate of said first point, the method further comprises the step of transforming said object from model coordinates to viewpoint coordinates by said floating point unit of said processor.

9. The method according to claim 6, wherein prior to the step of displaying said first point, the method further comprises the step of transforming said object from viewpoint coordinates to screen coordinates by said floating point unit of said processor.

10. A method for performing coordinate transformations concurrently with a clip checking scheme using an outcode for determining whether an object lies within a clipping window having a plurality of boundary constraints for display on a display device of a computer system comprising a processor including a floating point unit and an integer unit, the object including at least a first point having a plurality of coordinates each represented by a floating point number, the method comprising the steps of:

providing a storage unit coupled to said processor and said display device in order to store data representing a plurality of points forming the object;

converting each of said plurality of coordinates from its floating point representation into an integer representation having a bit pattern identical to a bit pattern of said floating point representation;

determining by said integer unit whether each of said plurality of coordinates is outside said clipping window;

designating that said first point is displayable if none of said plurality of bits forming said outcode are set, said integer unit generating a first signal to activate one of a first pair of bits of said outcode if a first coordinate of said plurality of coordinates of said first point is outside said clipping window and said integer unit generating a second signal to activate one of a second pair of bits of said outcode if a second coordinate of said plurality of coordinates of said first point is outside said clipping window;

repeating the providing, converting, determining and designating steps for each of said plurality of points forming the object to determine whether the object is displayable in its entirety; and displaying said displayable object through said display device.

11. The method according to claim 10, wherein the determining step includes setting one of a third pair of bits of said outcode if a third coordinate of said plurality of coordinates is outside said clipping window.

12. The method according to claim 11, wherein the determining step further comprises the step of:

converting of a normalizing coordinate from its floating point representation into an integer representation having a bit pattern identical to said floating point representation of said normalizing coordinate; and setting a bit of said outcode if a sign bit of said integer representation of said normalizing coordinate is set.

13. The method according to claim 12, wherein the determining step further comprises the steps of:

calculating a sign bit value of a difference between an absolute value of said integer representation of said normalizing coordinate and an absolute value of said integer representation of said first coordinate in a first integer storage element by said integer unit;

storing a bit pattern of said difference into a first integer storage element by said integer unit;

calculating a sum between an integer value of one and a value of a sign bit of said integer representation of said first coordinate by said integer unit;

storing a bit pattern of said sum into a second integer storage element by said integer unit;

performing a logical left shift of said bit pattern of said difference by said second integer storage element by said integer unit to obtain a shift result; and performing a bit-by-bit logical OR'ing of said outcode with said shift result by said integer unit.

14. The method according to claim 8, wherein the determining step further comprises the steps of:

calculating a sign bit value of a difference between an absolute value of said integer representation of said normalizing coordinate and an absolute value of said integer representation of said second coordinate in a first integer storage element by said integer unit;

storing a bit pattern of said difference into a first integer storage element by said integer unit;

calculating a sum between an integer value of three and a value of a sign bit of said integer representation of said second coordinate by said integer unit;

storing said sum into a second integer storage element by said integer unit;

performing a logical left shift of said bit pattern of said difference by said second integer storage element by said integer unit to obtain a shift result; and performing a bit-by-bit logical OR'ing of said outcode with said shift result by said integer unit.

15. The method according to claim 9, wherein the determining step further comprises the steps of:

calculating a sign bit value of a difference between an absolute value of said integer representation of said normalizing coordinate and an absolute value of said integer representation of said third coordinate in a first integer storage element by said integer unit;

storing a bit pattern of said difference into a first integer storage element by said integer unit;

calculating a sum between an integer value of five and a value of a sign bit of said integer representation of said third coordinate by said integer unit;

storing said sum into a second integer storage element by said integer unit;

performing a logical left shift of said bit pattern of said difference by said second integer storage element by said integer unit to obtain a shift result; and performing a bit-by-bit logical OR'ing of said outcode with said shift result by said integer unit.

16. The method according to claim 11, wherein the determining step further comprises the steps of:

calculating a sign bit value of a difference between said integer representation of said normalizing coordinate and an absolute value of said integer representation of said first coordinate in a first integer storage element by said integer unit;

storing a bit pattern of said difference into a first integer storage element by said integer unit;

calculating a sum between an integer value of one and a value of a sign bit of said integer representation of said first coordinate by said integer unit;

storing a bit pattern of said sum into a second integer storage element by said integer unit;

performing a logical left shift of said bit pattern of said difference by said second integer storage element by said integer unit to obtain a shift result; and performing a bit-by-bit logical OR'ing of said outcode with said shift result by said integer unit.

17. The method according to claim 16, wherein the determining step further comprises the steps of:

calculating a sign bit value of a difference between said integer representation of said normalizing coordinate and an absolute value of said integer representation of said second coordinate in a first integer storage element by said integer unit;

storing a bit pattern of said difference into a first integer storage element by said integer unit;

calculating a sum between an integer value of three and a value of a sign bit of said integer representation of said second coordinate by said integer unit;

storing said sum into a second integer storage element by said integer unit;

performing a logical left shift of said bit pattern of said difference by said second integer storage element by said integer unit to obtain a shift result; and performing a bit-by-bit logical OR'ing of said outcode with said shift result by said integer unit.

18. The method according to claim 17, wherein the method further comprises the steps of:

calculating a sign bit value of a difference between said integer representation of said normalizing coordinate and an absolute value of said integer representation of said third coordinate in a first integer storage element by said integer unit;

storing a bit pattern of said difference into a first integer storage element by said integer unit;

calculating a sum between an integer value of five and a value of a sign bit of said integer representation of said third coordinate by said integer unit;

storing said sum into a second integer storage element by said integer unit;

performing a logical left shift of said bit pattern of said difference by said second integer storage element by said integer unit to obtain a shift result; and performing a bit-by-bit logical OR'ing of said outcode with said shift result by said integer unit.

19. The method according to claim 18, wherein prior to the displaying step, the method further comprises the step of transforming said object from viewpoint coordinates to screen coordinates by said floating point unit of said processor.

20. In a system with a display device and a processor including an integer unit and a floating point unit, a method for enhancing performance of a clip checking scheme in determining a position of at least one point of an object with respect to a clipping window having a plurality of boundary constraints, a first point of said at least one point not being displayed on the display device if said first point is outside said clipping window, said first point includes both a first and second coordinates in a floating point representation, the method comprising the steps of:

providing said processor to convert said first coordinate from said floating point representation having a first bit pattern into an integer representation preserving said first bit pattern; and providing said integer unit to calculate an outcode associated with the first and second coordinates of the object by utilizing said first bit pattern;

providing said floating point unit to transform the object to coordinates utilized by the display device; and providing the display device to display the object based on said outcodes associated with the object.

21. An apparatus for performing a clip checking scheme using an outcode for determining a position of a multi-dimensional object with respect to a clipping window having a plurality of boundary constraints, wherein said multi-dimensional object includes at least a first point having at least a first and second coordinates represented as floating point numbers having first and second bit patterns and said clipping window being generated by a computer system comprising a processor, a memory element and a display device, said apparatus comprising:

an integer unit within said processor configured to generate a signal to active a bit of the outcode indicating that the multi-dimensional object is outside the clipping window if said integer unit determines that said first point forming the multi-dimensional object is outside the clipping window through bit manipulations of an integer representation having the first and second bit patterns; and a floating point unit configured to transform the multi-dimensional object into coordinates utilized by the display device.

22. A method for performing coordinate transformations concurrently with a clip checking scheme using an outcode in order to determine a position of at least a first point of a multi-dimensional object with respect to a clipping window having a plurality of boundary constraints, the clipping window being generated by a computer system comprising a display device and a processor including a floating point unit and an integer unit, the method comprising the steps of:

converting by said processor of a first coordinate of said first point from a floating point representation having a first bit pattern into an integer representation preserving said first bit pattern;

calculating by said integer unit whether said first coordinate is outside said clipping window by performing a plurality of steps including determining whether a most significant bit of said first bit pattern is set, said most significant bit being a sign bit of said integer representation of said first coordinate, determining whether a most significant bit of a first result is set, said most significant bit of said first result being a sign bit, said first result being a difference between an absolute value of said integer representation of said first coordinate and an integer representation of a first boundary constraint of said plurality of boundary constraints, and setting a first bit of said outcode by said integer unit to indicate that said first point is outside the clipping window if either said sign bit of said integer representation of said first coordinate is set or said most significant bit of said first result is set;

converting by said processor of a second coordinate of said first point from a floating point representation having a second bit pattern into an integer representation preserving said second bit pattern;

calculating by said integer unit whether said second coordinate is outside said clipping window through analysis of said second bit pattern and said plurality of boundary constraints; and displaying said first point by said display device if said first point is within said clipping window.

* * * * *

UNITED STATES PATENT AND TRADEMARK OFFICE
CERTIFICATE OF CORRECTION

PATENT NO.   : 5,638,500
DATED        : June 10, 1997
INVENTOR(S)  : Donovan et al.

It is certified that error appears in the above-identified patent and that said Letters Patent is hereby corrected as shown below:

Title page,
Item [54], Title, please replace "APPARATUS AND METHOD FOR DIRECT CALCULATION OF CLIP REGION" with -- APPARATUS AND METHOD FOR DIRECT CALCULATION OF CLIP REGION OUTCODES --.
Item [73], Assignee, please delete "Mountainview" and insert -- Mountain View --.
Item [57], ABSTRACT,
Line 1, please delete "calculate" and insert -- for calculating --.

Column 4,
Line 20, please insert -- a --, before "64-bit."

Column 12,
Line 9, please delete "coordinate is set said most significant" and insert -- coordinate is set, said most significant --.

Signed and Sealed this

Tenth Day of September, 2002

Attest:

JAMES E. ROGAN
*Attesting Officer*   *Director of the United States Patent and Trademark Office*